United States Patent
Peters et al.

(10) Patent No.: US 7,520,423 B2
(45) Date of Patent: Apr. 21, 2009

(54) MULTI-VENDOR AGENT FOR A SELF-SERVICE TERMINAL

(75) Inventors: Torsten Peters, Haenigsen (DE); Matthias Rudolph, Hannover (DE)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/314,062

(22) Filed: Dec. 21, 2005

(65) Prior Publication Data

US 2007/0158406 A1   Jul. 12, 2007

(51) Int. Cl.
*G06Q 40/00* (2006.01)
(52) U.S. Cl. .............................. 235/379; 705/42; 705/43
(58) Field of Classification Search .................. 235/375, 235/379–381; 705/42, 43
See application file for complete search history.

(56) References Cited

U.S. PATENT DOCUMENTS

| | | | |
|---|---|---|---|
| 6,308,887 B1 * | 10/2001 | Korman et al. ............... | 235/379 |
| 6,908,032 B1 | 6/2005 | Somers et al. | |
| 2001/0037301 A1 * | 11/2001 | Shepley et al. ................ | 705/43 |
| 2002/0035541 A1 * | 3/2002 | Makino et al. ................ | 705/43 |
| 2002/0120500 A1 * | 8/2002 | Johnson ........................ | 705/14 |
| 2002/0139842 A1 * | 10/2002 | Swaine ......................... | 235/379 |
| 2002/0147684 A1 * | 10/2002 | Kirkhope et al. .............. | 705/43 |
| 2003/0208405 A1 | 11/2003 | Putman et al. | |
| 2004/0122771 A1 * | 6/2004 | Celi et al. ...................... | 705/43 |
| 2004/0149819 A1 | 8/2004 | Shepley et al. | |
| 2005/0078177 A1 * | 4/2005 | Gotanda ....................... | 348/114 |
| 2006/0180655 A1 * | 8/2006 | Meek et al. ................... | 235/379 |

FOREIGN PATENT DOCUMENTS

WO    WO 01/90850 A2    11/2001

OTHER PUBLICATIONS

Dino Esposito: "Windows Hooks in the .NET framework", MSDN Magazine, Oct. 2002-Dec. 5, 2004, XP007901588.

* cited by examiner

*Primary Examiner*—Thien Minh Le
*Assistant Examiner*—Tuyen K Vo
(74) *Attorney, Agent, or Firm*—Gregory A. Welte

(57) ABSTRACT

A self-service terminal includes at least one electromechanical hardware component (e.g., a display monitor, a card reader, a cash dispenser, a cash acceptor, and a statement printer) configured to interact physically with a human user of the self-service terminal as the user engages in a financial transaction between the user and a financial-services institution. A self-service component is configured to control operation of the electromechanical hardware component as the electromechanical hardware component interacts physically with the user during the financial transaction, and a client component is configured to interact with the electromechanical hardware component at least once while the financial transaction is in progress. The self-service terminal also includes a messaging-interface component configured to intercept a message that is intended to grant the self-service component control of the electromechanical hardware component and, before allowing delivery of the message to the self-service component, to allow the client component to interact with the electromechanical hardware component.

3 Claims, 4 Drawing Sheets

US 7,520,423 B2

MULTI-VENDOR AGENT FOR A SELF-SERVICE TERMINAL

BACKGROUND

The financial-services industry, particularly the banking industry, suffers from a lack of compatibility between self-service terminals, such as automated teller machines (ATMs), and self-service applications produced by competing vendors. In general, a self-service application in the financial-services industry is a computer-based application that controls the fundamental operation of the self-service terminal (SST), enabling consumers to execute financial transactions on the SST. As a general rule, the self-service applications available in the marketplace are vendor specific, meaning that each will function only with the SST of a particular vendor. For financial-service institutions that purchase SSTs from multiple vendors, self-service applications for those SSTs must also be purchased from multiple vendors as well.

This lack of compatibility also extends to other SST applications, in particular client applications aimed at extending the functionality of the SST. Such client applications include customer relationship management (CRM) applications, which allow the financial institution to mount CRM campaigns toward the user of the SST, and system-management applications, which allow the financial institution to monitor and control the operation of the SST through a simple interface.

FIG. 1 shows a standard architecture for a financial-services self-service terminal (SST) 100, in this case an SST built on the Microsoft Windows NT or XP operating system (OS), the Windows Open Services Architecture (WOSA), and the Extensions for Financial Services (XFS) interface standard, in particular the XFS standard as put forth by the European Committee for Standardization (CEN), known as "CEN/XFS." The SST 100 features a layered architecture in which the Windows OS 110 supports a WOSA/XFS platform 120. A self-service application 130 sits on top of the WOSA/XFS platform 120 and controls interaction between the SST 100 and customers using the SST, primarily through a browser 140 displayed on a monitor within the SST.

The SST 100 often includes one or more client applications 150, such as a CRM application or system-management application, that extend functionality of the SST 100 beyond that offered by the basic self-service application 130. The operation of any client application that resides on the SST in this example is controlled by the self-service application 130.

Traditionally, each client application is designed for operation with only one type of self-service application and thus is packaged by its vendor for sale and for operation with that application. The result is that financial-services institutions are not able to combine the functionality of one vendor's client applications with another vendor's self-service application.

SUMMARY

A self-service terminal includes at least one electromechanical hardware component (e.g., a display monitor, a card reader, a cash dispenser, a cash acceptor, and a statement printer) configured to interact physically with a human user of the self-service terminal as the user engages in a financial transaction between the user and a financial-services institution. A self-service component is configured to control operation of the electromechanical hardware component as the electromechanical hardware component interacts physically with the user during the financial transaction, and a client component is configured to interact with the electromechanical hardware component at least once while the financial transaction is in progress. The self-service terminal also includes a messaging-interface component configured to intercept a message that is intended to grant the self-service component control of the electromechanical hardware component and, before allowing delivery of the message to the self-service component, to allow the client component to interact with the electromechanical hardware component.

In some systems, the client component, in interacting with the electromechanical hardware component, is configured to assume control of operation of the electromechanical hardware component and, in doing so, to instruct the electromechanical hardware component to deliver information to the user. The information delivered to the user is often information that is not necessary for completing the financial transaction, such as information targeting the user in a customer-relationship management campaign conducted by the financial-services institution.

In some systems, the client component, in assuming control of the electromechanical hardware component, is configured to receive information from the user through the electromechanical hardware component. The client component is also often configured to receive from the electromechanical hardware component information relating to an operational status of the component.

In some systems, the messaging-interface component is configured to intercept all messages intended for the self-service component, and in other systems, the messaging-interface component is configured to intercept some, but not all, messages intended for the self-service component. To allow the interception of messages intended for the self-service component, the messaging-interface component is often configured to hook all messages concerning a certain type of event in the self-service terminal. The messaging-interface component is also often configured to replace a standard dynamic link library (DLL), such as the Microsoft Windows file "msxfs.dll," residing within the self-service terminal with a custom DLL.

Other features and advantages will become apparent from the description and claims that follow.

DETAILED DESCRIPTION

Figure 1:
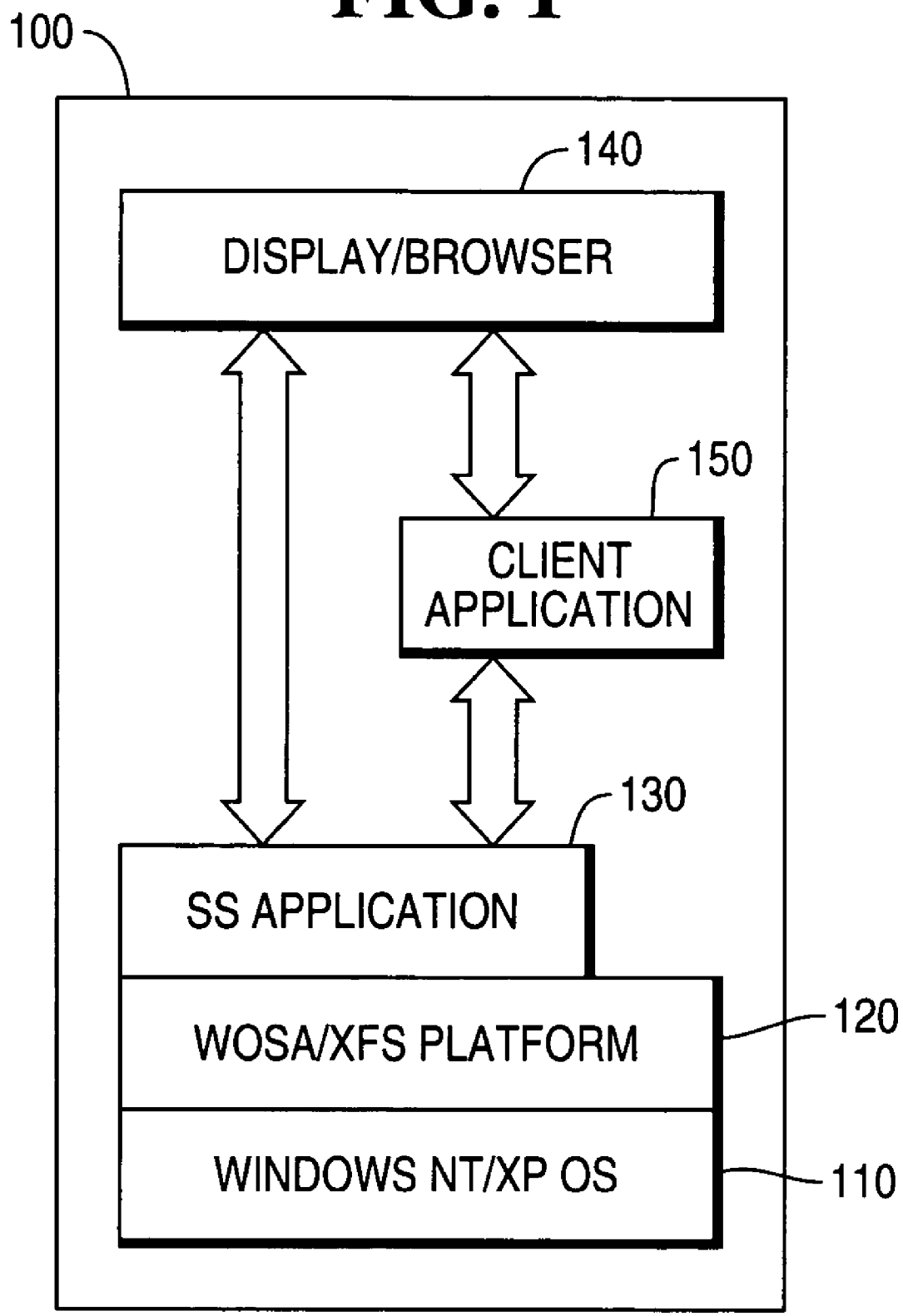
FIG. 1 is a diagram showing an architecture for a traditional financial-services self-service terminal (SST).
Figure 2:
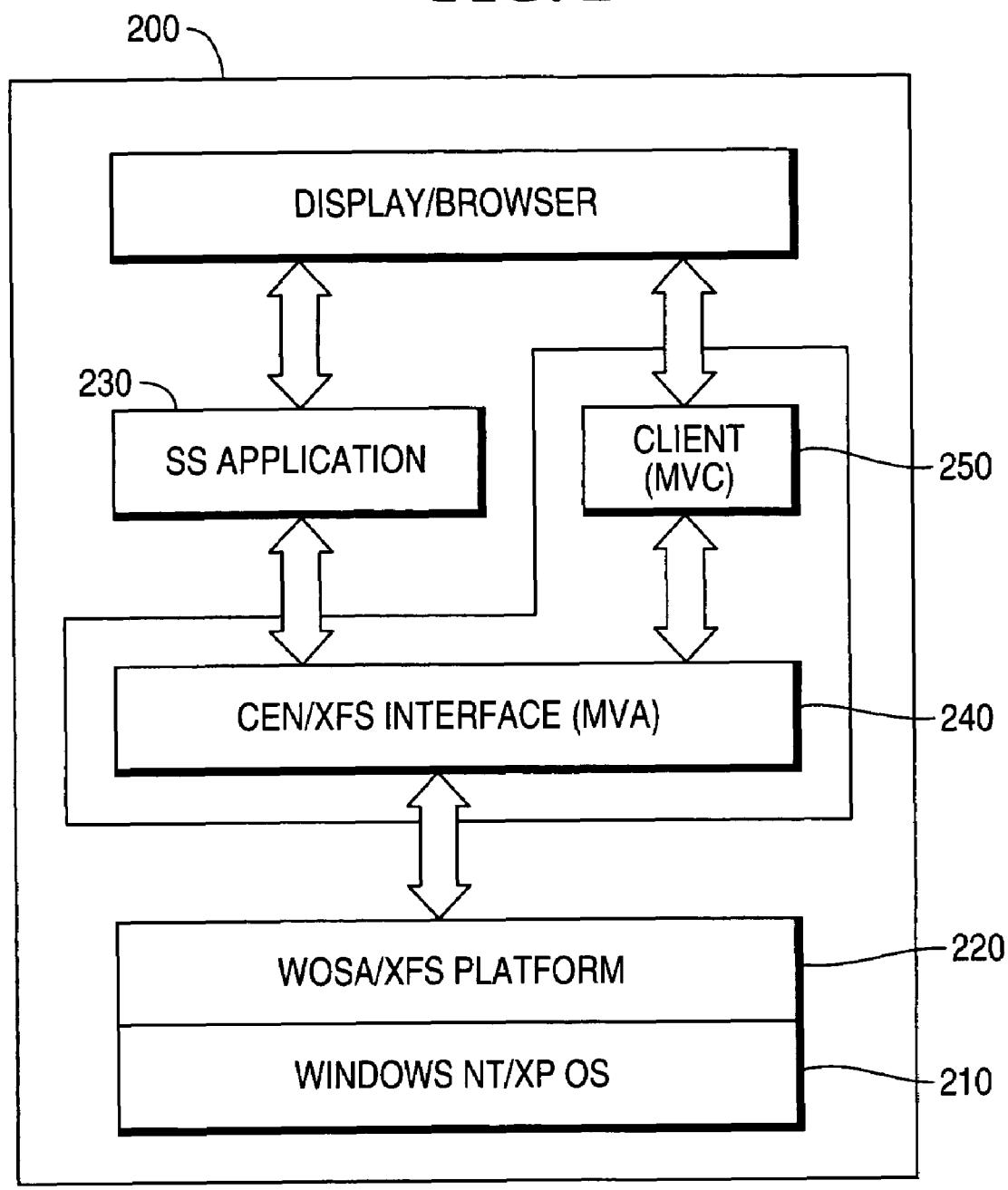
FIG. 2 is a diagram showing one example of an architecture for a financial-services SST that supports multi-vendor applications.

FIG. 2 shows a financial-services self-service terminal (SST) 200, such as an automated teller machine (ATM), that supports the operation of self-service and client applications produced by multiple application vendors. The SST 200 shown here is one built on the Microsoft Windows NT or XP operating system (OS), the Windows Open Services Architecture (WOSA), and the CEN/XFS interface standard, although SSTs built on other operating systems and interface schemes are suitable for use as well. The CEN/XFS standard defines a common interface for accessing devices (e.g., card readers, encrypted pin pads (EPPs), and cash dispensers) that are unique to self-service terminals in the financial-services industry. The CEN/XFS standard defines a generalized Windows application programming interface (API) that provides a predefined and standardized set of function calls and event mechanisms for performing basic input/output (I/O) functions in financial-services SSTs.

The SST 200 of FIG. 2 features a layered architecture much like the traditional architecture described above, in which a self-service application 230 sits atop a WOSA/XFS platform 220 and the Windows OS 210. In many, if not most, SSTs, the self-service application 230 is provided by the same vendor who manufactures the SST 200. Unlike the traditional SST architecture, however, the SST 200 of FIG. 2 includes a CEN/XFS-compliant interface layer, known as a "multi-vendor agent" (MVA) 240, positioned between the WOSA/XFS platform 220 and the self-service application 230.

The SST 200 also includes a multi-vendor client application (MvC), or simply multi-vendor client 250, which is typically produced by the same vendor that produces the multi-vendor agent 240. The multi-vendor client 250 and multi-vendor agent 240 are designed to allow operation of the multi-vendor client 250 with a self-service application 230 that is produced by another vendor altogether. In other words, the multi-vendor client 250 and multi-vendor agent 240 together serve to make application processing on the SST 200 vendor-independent.

To do so, the multi-vendor client 250 works in conjunction with the multi-vendor agent 240 to suspend operation of the self-service application 230 from time to time, as described below, for the purpose of granting control of device-based I/O operations in the SST 200 to the multi-vendor client 250. Doing so allows the multi-vendor client 250 to interact with consumers engaged in financial transactions with the SST 200 while those transactions are taking place, even though the transactions themselves are under the control of the self-service application 230.

The multi-vendor agent 240 enables operation of the multi-vendor client 250 by replacing the standard Windows dynamic link library (DLL) for XFS calls—"msxfs.dll"—with a DLL that provides more functionality than is available with the standard Windows DLL. The multi-vendor agent 240 also employs the Windows "event hook" technique to catch all XFS events occurring in the WOSA/XFS platform 220 before these events are propagated to the self-service application 230. The result is that the multi-vendor agent 240 is able to assume full control of device-based I/O operations on the SST 200 and therefore is able suspend, and then later resume, operation of the self-service application at any time.

The multi-vendor agent 240 also provides a simulated application programming interface (API) to the multi-vendor client 250, giving the multi-vendor client access to the CEN/XFS API that governs interaction with SST device (e.g., for reading the SST's functional keys or its encrypted pin pad (EPP)). The simulated API also allows the multi-vendor client 250 to control certain portions of the SST's interaction with the consumer (e.g., card insertion, statement printing, note dispensing, and card removal).

To access this simulated API, the multi-vendor client 250 registers with the multi-vendor agent 240 and receives in return a handle that is valid for all API calls to the multi-vendor agent. The multi-vendor agent 240 identifies for the multi-vendor client 250 those portions of the consumer interaction with the SST at which the multi-vendor client can take control of the SST and interact with the consumer. In most cases, when the multi-vendor client 250 takes control of the SST, the SST's standard graphical display (i.e., the display created by the self-service application 230) is replaced by a graphical display generated by the multi-vendor client 250.

A multi-vendor client 250 like that shown here allows for functional enhancements to the SST 200 that the vendor of the SST and the self-service application might not offer. Examples of such enhancements in connection with a CRM application include the following.

Card insertion: The multi-vendor agent 240 monitors the card reader and notifies the multi-vendor client 250 when a bank card is inserted. The multi-vendor agent temporarily hides the card-reader event from the self-service application 230, so the self-service application does not know right away to begin the consumer session. On receiving the message from the multi-vendor agent, the multi-vendor client pulls embedded data from the inserted card and uses this data to determine whether the financial-services institution has defined a CRM campaign for this consumer. If so, the multi-vendor client initiates a CRM action for the consumer. Upon completion of the CRM action, the multi-vendor client returns control of the SST to the multi-vendor agent, which in turn informs the self-service application of the card event. At this point, the self-service application is able to initiate a transaction session with the consumer.

Statement printing: The multi-vendor agent 240 monitors any invocation of the statement printer. Upon identifying a print command, the multi-vendor agent assumes control of the consumer session and notifies the multi-vendor client 250, delivering the data that is embedded in the card to the multi-vendor client. Once again, the multi-vendor client uses this data to determine whether the financial-services institution has defined a CRM campaign for this consumer and, if so, initiates a CRM action. As the multi-vendor client carries out the CRM action, the self-service application 230 is allowed to execute the print command. All other commands or events, however, that are not related to the print job are hidden from the self-service application. Upon completing the CRM action, the multi-vendor client notifies the multi-vendor agent that it is done, and the multi-vendor agent returns control of the consumer session to the self-service application.

Cash dispensing: The multi-vendor agent 240 monitors any invocation of the cash dispenser. Upon identifying a cash-dispense command, the multi-vendor agent assumes control of the consumer session and notifies the multi-vendor client 250, delivering the data that is embedded in the card to the multi-vendor client. Once again, the multi-vendor client uses this data to determine whether the financial-services institution has defined a CRM campaign for this consumer and, if so, initiates a CRM action. As the multi-vendor client carries out the CRM action, the self-service application 230 is allowed to execute the cash-dispense command. All other commands or events, however, that are not related to the cash-dispense job are hidden from the self-service application. Upon completing the CRM action, the multi-vendor client notifies the multi-vendor agent that it is done, and the multi-vendor agent returns control of the consumer session to the self-service application.

Consumer interaction: When the multi-vendor agent has assumed control of the SST, it can enable the multi-vendor client to access any XFS-defined devices of the SST, such as function keys, the encrypted pin pad (EPP), or switches. Granting the multi-vendor client access to these devices allows the multi-vendor client to receive feedback from the consumer as it conducts the financial institution's CRM campaign.

For a multi-vendor client application that serves as a system-management client, the multi-vendor client provides a simple, XML-based HTTP (hypertext transfer protocol) interface to perform the following system-management functions:

(1) Monitoring devices of the SST;
(2) Monitoring the state of the self-service application;
(3) Monitoring counters, such as cash counters, in the SST;
(4) Collecting and providing basic transaction statistics; and
(5) Providing external control of the SST and the self-service application.

In monitoring the SST and its devices, a multi-vendor system-management client application retrieves XFS-based information about the SST devices and their states and about the SST counters. In some cases, the multi-vendor system-management client also includes logical functions that allow it to derive additional state information from a variety of XFS conditions existing in the SST.

Perhaps the key feature of such a multi-vendor system-management client application, however, is the ability to acquire certain types of information about the SST through the multi-vendor agent, information about self-service states, transaction data and transaction statistics. The ability to gather this type of information allows the system-management client to perform system-management in a way that is not available in traditional XFS-based system-management solutions.

Figure 3:
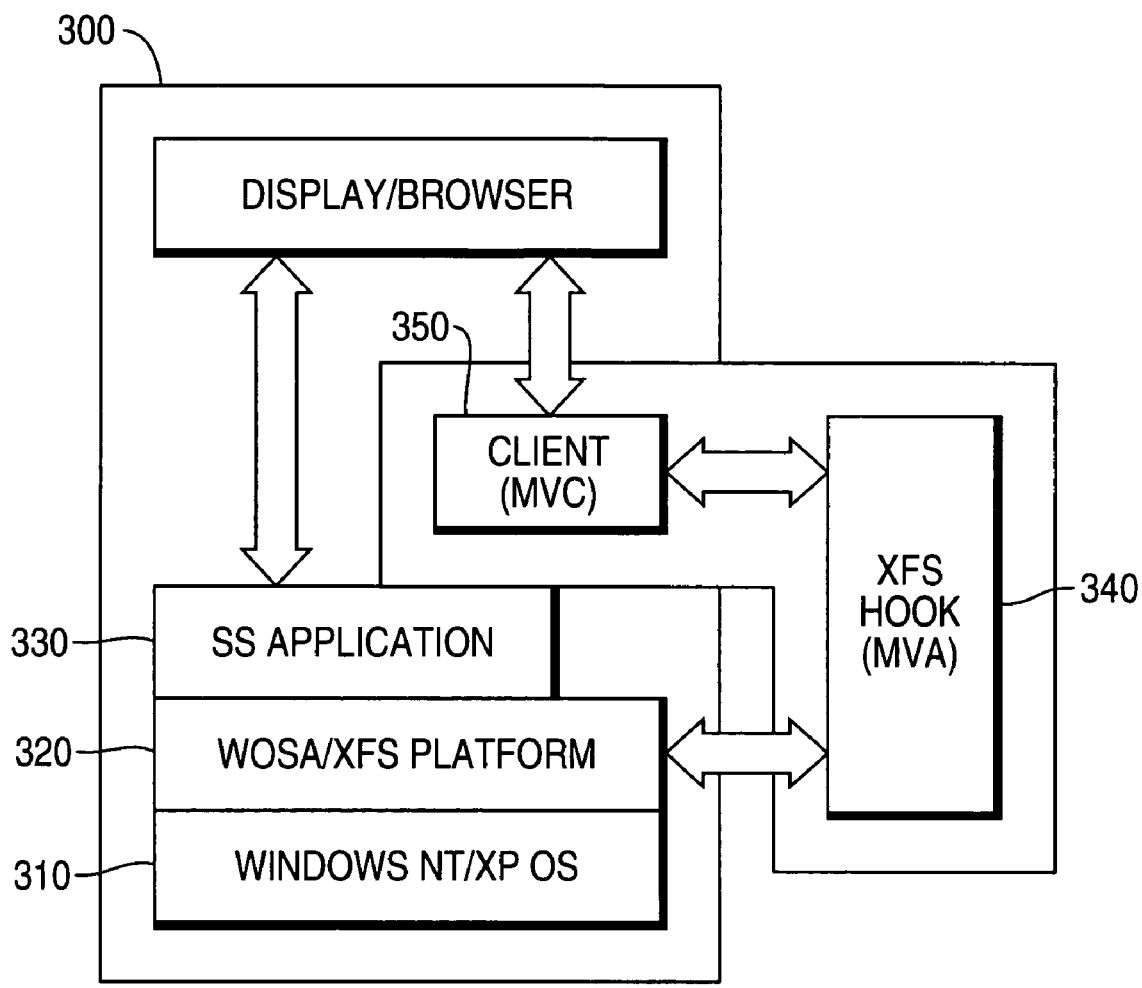
FIG. 3 is a diagram showing another example of an architecture for a financial-services SST that supports multi-vendor applications.

FIG. 3 shows an alternative architecture for a financial-services self-service terminal (SST) 300 that supports the operation of self-service and client applications produced by multiple application vendors. The SST 300 in this example, like the one in FIG. 2, is also built on the Microsoft Windows NT or XP operating system (OS), the Windows Open Services Architecture (WOSA), and the CEN/XFS interface standard.

The SST 300 of FIG. 3 also features a layered architecture in which a self-service application 330 sits atop a WOSA/XFS platform 320 and the Windows OS 310. Instead of a CEN/XFS-compliant interface layer positioned between the WOSA/XFS platform 320 and the self-service application 330, however, the multi-vendor agent 340 in this example includes a Windows XFS hook that allows the multi-vendor agent to hook itself into the Windows function-call mechanism. Hooking into the Windows function-call mechanism allows the multi-vendor agent 340 to reroute XFS function calls by the WOSA/XFS platform 320 from the self-service application 330 to its own procedures. In this manner, the multi-vendor agent 340 is able to assume control of device-based I/O operations in the SST 300 and grant control of these operations to a multi-vendor client 350, like those described in connection with FIG. 2 above. One advantage to the architecture shown in FIG. 3 is that there is no need to replace any DLL files in the WOSA/XFS platform 320; no changes are necessary in either the self-service application 330 or the WOSA/XFS platform 320.

Figure 4:
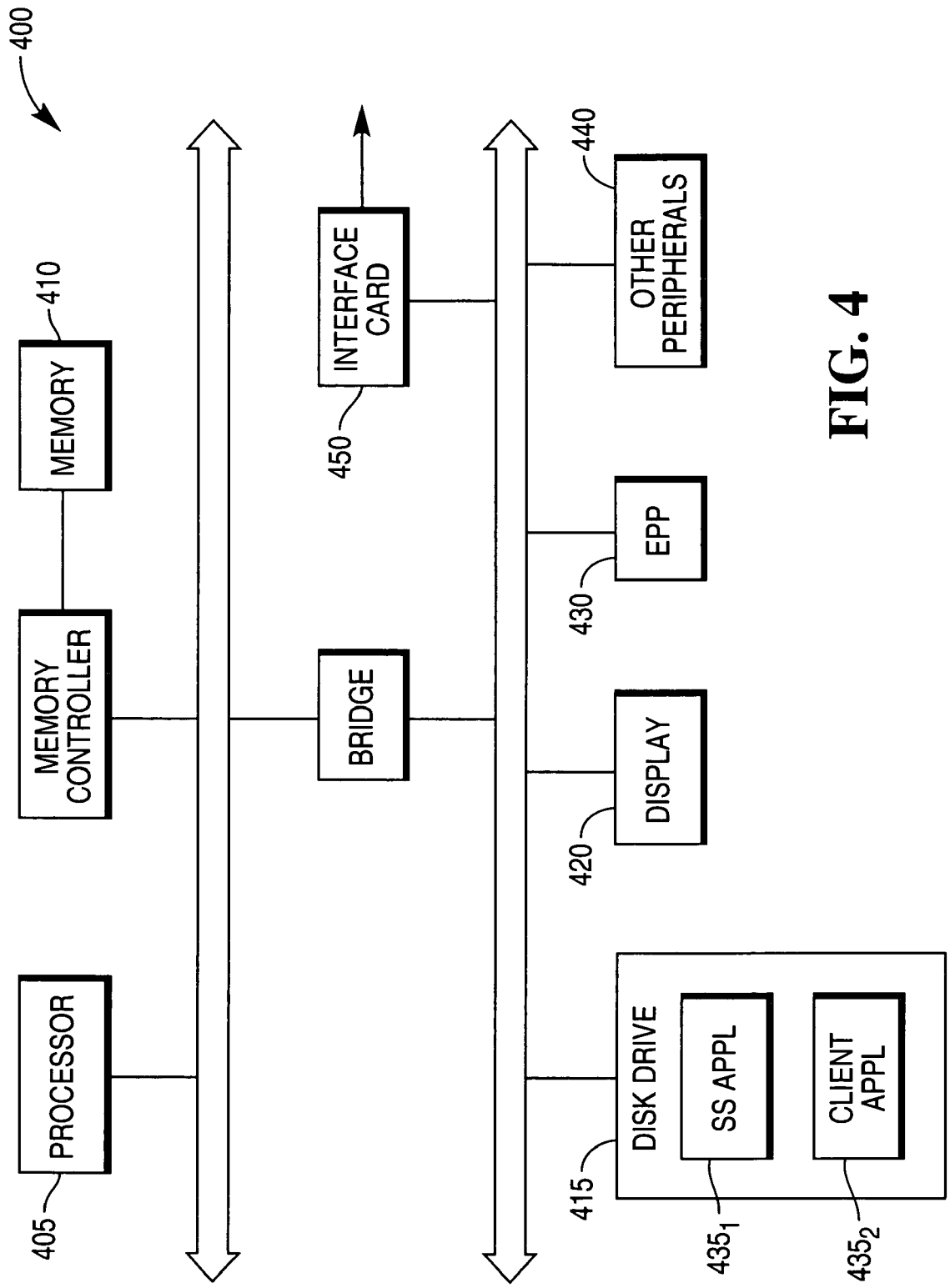
FIG. 4 is a diagram showing the structure of a computer system suitable for use in implementing the financial-services SSTs of FIGS. 3 and 4.

FIG. 4 shows an example structure of a computer system 400 that is suitable for implementing a financial-services self-service terminal (SST) that supports multi-vendor applications. The computer system 400 includes some or all of the following components: one or more processors 405, one or more temporary data-storage components 410 (e.g., volatile and nonvolatile memory modules), one or more persistent data-storage components 415 (e.g., optical and magnetic storage devices, such as hard and floppy disk drives, CD-ROM drives, and magnetic tape drives), an output device such as a display monitor 420, a input device such as an encrypted pin pad (EPP) 430, and one or more other peripheral devices 440. The other peripheral devices 440 typically include any of a wide variety of electronic modules commonly found in self-service terminals in the financial-services industry, such a card reader, a cash dispenser, a cash acceptor, a coin dispenser, a coin acceptor, a check acceptor, and a receipt printer. The computer system 400 also includes a network interface card 450 that allows the terminal to connect to a financial-services network, which typically includes a local area network (LAN) in a physical branch facility of the financial-services institution, as well as a larger wide area network (WAN) and an ATM switching network.

The SST also includes executable program code, in the form of one or more executable program modules, that is typically stored in one of the persistent storage media 415 and then copied into memory 410 at run-time. In the SST described here, this program code includes a self-service application program $435_1$ and a multi-vendor client application program $435_2$, like those described above. The processor 405 in the SST executes the corresponding program $435_{1-2}$ by retrieving program instructions from memory in a prescribed order and acting on those instructions.

The text above describes one or more specific embodiments of a broader invention. The invention also is carried out in a variety of alternative embodiments and thus is not limited to those described here. Many other embodiments are also within the scope of the following claims.

We claim:

1. An Automated Teller Machine, ATM, comprising:
    a) a control program (230), which
        i) is manufactured by a first party who manufactures the ATM, and
        ii) controls operation of hardware in the ATM;
    b) a Multi-Vendor Agent, MVA, program (240), which is manufactured by a party other than the first party, and which
        i) detects a card-insertion event by a customer and, in response,
            A) obtains data about the customer,
            B) determines whether the data indicates that advertising should be presented to the customer and, if so,
                1) temporarily hides knowledge of the card-insertion from the control program (230), thereby blocking initiation of a customer session,
                2) presents advertising to the customer, prior to any customer session, and then
                3) informs the control program (230) of the card-insertion, whereupon the customer session initiates;
        ii) detects invocation of a printing operation in the ATM and, in response,
            A) obtains data about the customer,
            B) determines whether the data indicates that advertising should be presented to the customer and, if so,
                1) presents advertising to the customer,
                2) allows the printing operation to occur while the advertising is presented, and
                3) temporarily suspends control of the ATM by the control program (230) while the advertising is presented.

2. An ATM according to claim 1, in which the MVA program (240) further ii) detects invocation of a cash-dispense operation in the ATM and, in response,
   A) obtains data about the customer,
   B) determines whether the data indicates that advertising should be presented to the customer and, if so,
      1) presents advertising to the customer,
      2) allows the cash-dispense operation to occur while the advertising is presented, and
      3) temporarily suspends control of the ATM by the control program (230) while the advertising is presented.

3. An ATM according to claim 1, in which the MVA program (240)
   1) restores control of the ATM to the control program (230) after advertising is presented.

* * * * *